(12) United States Patent
Johri et al.

(10) Patent No.: US 9,688,268 B2
(45) Date of Patent: Jun. 27, 2017

(54) METHOD FOR CONTROLLING AN ELECTRIC MACHINE IN A VEHICLE WITH AN ENGINE DISCONNECT CLUTCH

(71) Applicant: FORD GLOBAL TECHNOLOGIES, LLC, Dearborn, MI (US)

(72) Inventors: Rajit Johri, Ann Arbor, MI (US); Xiaoyong Wang, Novi, MI (US); Wei Liang, Farmington Hills, MI (US); Mark Steven Yamazaki, Canton, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/302,987

(22) Filed: Jun. 12, 2014

(65) Prior Publication Data
US 2015/0360679 A1    Dec. 17, 2015

(51) Int. Cl.
| | |
|---|---|
| *B60W 20/00* | (2016.01) |
| *B60K 6/547* | (2007.10) |
| *B60K 6/387* | (2007.10) |
| *B60K 6/48* | (2007.10) |
| *B60W 20/40* | (2016.01) |
| *B60W 10/02* | (2006.01) |
| *B60W 10/06* | (2006.01) |
| *B60W 10/08* | (2006.01) |

(52) U.S. Cl.
CPC ............ *B60W 20/40* (2013.01); *B60K 6/387* (2013.01); *B60K 6/547* (2013.01); *B60W 10/02* (2013.01); *B60W 10/06* (2013.01); *B60W 10/08* (2013.01); *B60K 2006/4825* (2013.01); *B60W 2510/0241* (2013.01); *B60W 2510/0275* (2013.01); *B60W 2510/0638* (2013.01); *B60W 2510/081* (2013.01); *B60W 2540/10* (2013.01); *B60W 2710/025* (2013.01); *B60W 2710/083* (2013.01); *Y02T 10/6252* (2013.01); *Y02T 10/6286* (2013.01); *Y10S 903/93* (2013.01); *Y10T 477/32* (2015.01); *Y10T 477/328* (2015.01)

(58) Field of Classification Search
CPC ................................................ B60W 2030/203
See application file for complete search history.

(56) References Cited

U.S. PATENT DOCUMENTS

| | | | | |
|---|---|---|---|---|
| 6,823,954 | B2 * | 11/2004 | Shimabukuro | B60K 6/48 123/179.1 |
| 7,617,808 | B2 * | 11/2009 | Aswani | B60K 6/485 123/179.3 |
| 8,123,656 | B2 | 2/2012 | Schoenek et al. | |
| 8,612,104 | B2 | 12/2013 | Kojima et al. | |
| 9,102,327 | B2 * | 8/2015 | Tanishima | B60K 6/48 |
| 2007/0087894 | A1 * | 4/2007 | Tsuneyoshi | B60K 6/445 477/3 |
| 2007/0102211 | A1 * | 5/2007 | Nozaki | B60K 6/48 180/65.7 |
| 2012/0081051 | A1 * | 4/2012 | Kobayashi | B60K 6/48 318/400.23 |
| 2012/0083952 | A1 * | 4/2012 | Smith | B60K 6/442 701/22 |
| 2012/0323418 | A1 | 12/2012 | Sah et al. | |
| 2013/0226384 | A1 * | 8/2013 | Tanishima | B60L 11/123 701/22 |
| 2013/0296109 | A1 | 11/2013 | Nedorezov et al. | |
| 2013/0297113 | A1 | 11/2013 | Banker et al. | |
| 2014/0046529 | A1 | 2/2014 | Gibson et al. | |

FOREIGN PATENT DOCUMENTS

JP    WO2012/056857    *    3/2012

* cited by examiner

*Primary Examiner* — Mark Manley
(74) *Attorney, Agent, or Firm* — David B. Kelley; Brooks Kushman P.C.

(57) ABSTRACT

A method of controlling a vehicle, in which the vehicle includes an engine, a traction motor, and a clutch configured to selectively couple the engine to the motor, includes commanding the traction motor to provide an incremental torque. The motor is commanded to provide the incremental torque in response to the clutch being in a slipping condition. The magnitude of the commanded incremental torque is in response to the lesser of first and second torques. The first torque corresponds to an engine torque, and the second torque corresponds to a clutch torque capacity.

11 Claims, 4 Drawing Sheets ical U.S. Pat. No. 9,688,268 B2

METHOD FOR CONTROLLING AN ELECTRIC MACHINE IN A VEHICLE WITH AN ENGINE DISCONNECT CLUTCH

TECHNICAL FIELD

The present disclosure relates to controlling a motor while engaging or disengaging a disconnect clutch in a hybrid vehicle.

BACKGROUND

Hybrid electric vehicles include both engines and traction motors. One method of improving the fuel economy in an HEV is to shut down the engine during times that the engine operates inefficiently, and is not otherwise needed to propel the vehicle. In these situations, the electric motor is used in an electric drive mode to provide all of the power needed to propel the vehicle. Some hybrid electric vehicle powertrain configurations include a disconnect clutch configured to selectively disengage the engine from the motor and transmission while operating in electric drive mode.

SUMMARY

A method of controlling a vehicle according to the present disclosure, in which the vehicle includes an engine, a transmission, and an electric machine capable of providing drive torque, selectively coupled to the engine via a clutch, and selectively coupled to the transmission, includes commanding the electric machine to provide drive torque. The command to the electric machine is in response to a driver torque request and the engine being off. The method additionally includes, in response to an engine start request, commanding the clutch to shift from an open position through a slipping position to a locked position. The method further includes, in response to the clutch being in the slipping position, commanding the electric machine to provide a total torque corresponding to a sum of the drive torque and an incremental torque, the incremental torque being based on a clutch torque capacity.

In one embodiment, the clutch torque capacity is based on a clutch pressure, a radius of a friction surface, a number of friction surfaces, and a clutch friction coefficient. In another embodiment, the incremental torque is further in response to a difference between an engine speed and a motor speed. This may include a hyperbolic tangent function of the difference between the engine speed and the motor speed.

A vehicle according to the present disclosure includes an engine, a traction motor, a disconnect clutch configured to selectively couple the engine and motor; and a controller. The controller is configured to, in response to the clutch slipping, command the traction motor to provide an incremental torque. The magnitude of the incremental torque is based on the lesser of a first torque corresponding to an engine torque and a second torque corresponding to a clutch torque capacity.

In one embodiment, the incremental torque is further based on a difference between an engine speed and a motor speed. This may include a hyperbolic tangent function of the difference between the engine speed and the motor speed. In some embodiments, the clutch torque capacity is a function of a clutch pressure, a radius of a friction surface, a number of friction surfaces, and a clutch friction coefficient. In a further embodiment, the controller is additionally configured to, in response to a driver torque request, command the traction motor to provide a total torque corresponding to a sum of a drive torque based on the driver torque request and the incremental torque.

A method of controlling a vehicle according to the present disclosure, where the vehicle includes an engine, a traction motor, and a clutch configured to selectively couple the engine to the motor, includes commanding the traction motor to provide an incremental torque. The motor is commanded to provide the incremental torque in response to the clutch being in a slipping condition and further in response to a current engine torque. The magnitude of the commanded incremental torque is based on the lesser of first and second torques. The first torque corresponds to the engine torque, and the second torque corresponds to a clutch torque capacity. Drive torque provided by the motor is thus generally uninterrupted.

In one embodiment, the incremental torque is further based on a difference between an engine speed and a motor speed. This may include a hyperbolic tangent function of the difference between the engine speed and the motor speed. In some embodiments, the clutch torque capacity is based on a clutch pressure, a radius of a friction surface, a number of friction surfaces, and a clutch friction coefficient. An additional embodiment additionally includes, in response to the clutch being in a slipping condition and a current engine torque being unavailable, commanding the traction motor to provide an incremental torque based on the second torque corresponding to the clutch torque capacity. A further embodiment additionally includes, in response to a driver torque request, commanding the traction motor to provide a total torque corresponding to a sum of a drive torque corresponding to the driver torque request and the incremental torque.

Embodiments according to the present disclosure provide a number of advantages. For example, the present disclosure provides a robust, reliable method for controlling a motor to compensate for torque across a disconnect clutch, thus reducing noise, vibration, and harshness ("NVH").

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
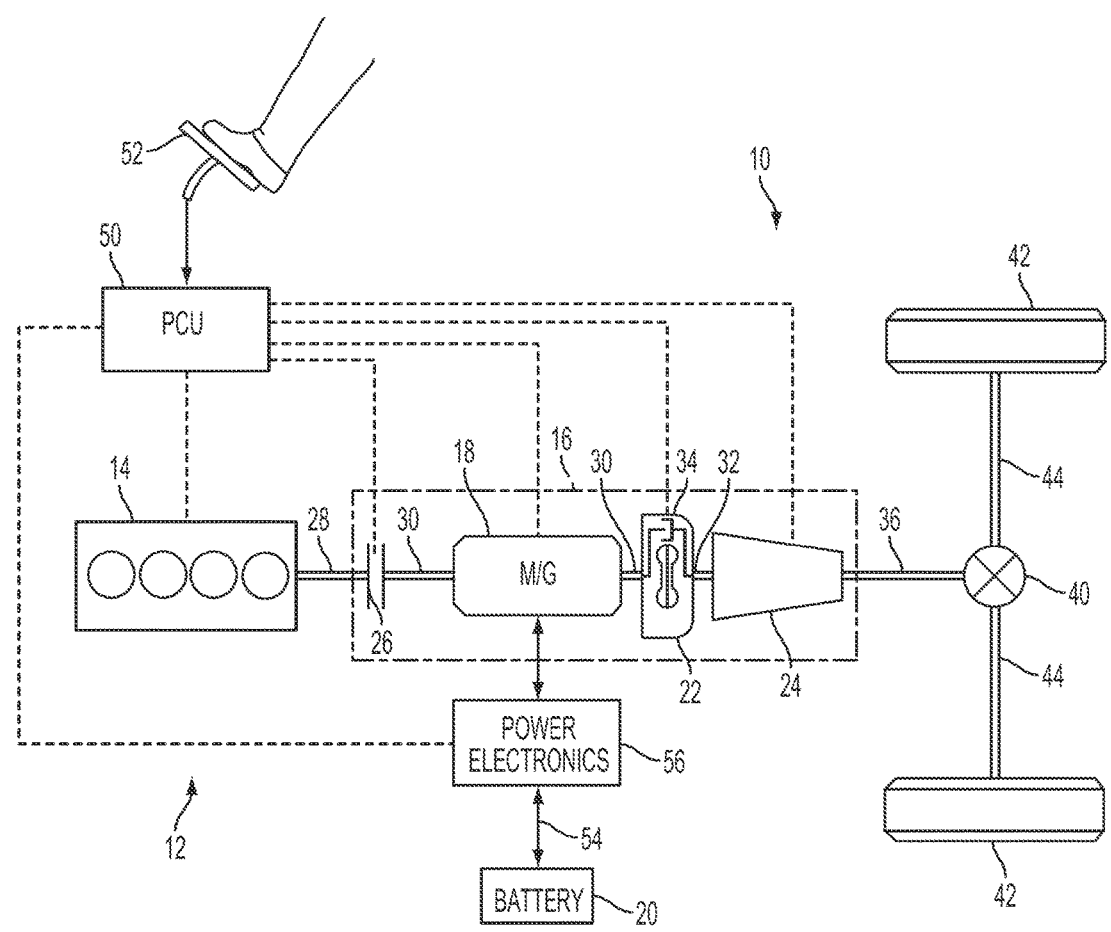
FIG. 1 is a schematic illustration of a hybrid electric vehicle having a modular powertrain configuration.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics 56 condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged. When the disconnect clutch 26 is engaged, a fixed speed relationship exists between the speed of the engine 14 and the speed of the M/G 18.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU) 50. The gearbox 24 then provides powertrain output torque to output shaft 36. The gearbox 24 may be understood to provide a selectable fixed speed relationship between the speed of M/G 18 and the speed of vehicle traction wheels 42.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, PCU 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by PCU 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by PCU 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as PCU 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The PCU 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

When operating in electric only mode (i.e. the internal combustion engine is turned off), an engine start may be requested in response to various inputs. As an example, an engine start may be requested in response to a driver torque request exceeding a motor torque capacity, to a battery state of charge falling below a predefined threshold, or in response to a high electric accessory load. In response to an engine start request, the engine may be started according to various control strategies. According to one control strategy, the engine is started using a low voltage electric starter. In an alternative control strategy, the engine is started by engaging the disconnect clutch and controlling the traction motor to start the engine.

When starting the engine using the traction motor, torque is transferred from the motor through the disconnect clutch to the engine. The traction motor torque must overcome compression and friction forces within the engine before the engine starts. The torque transferred through the disconnect clutch to the engine may reduce the motor torque available for other purposes, such as drive torque. If the traction motor is providing drive torque as the clutch is engaged, the torque transfer to the engine may thus cause NVH or other undesirable drivetrain effects.

Figure 2:
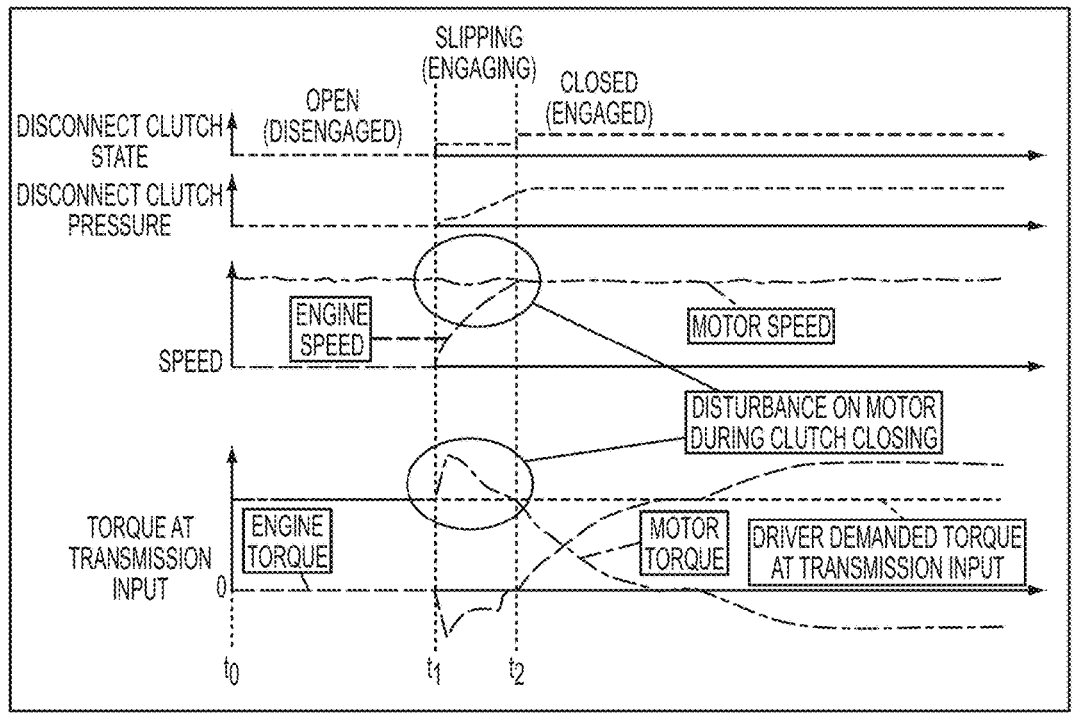
FIG. 2 illustrates engine and motor speeds and torques during a sample engine start.

Referring to FIG. 2, a graph illustrating engagement of a disconnect clutch in a hybrid vehicle during engine start is shown. From $t_0$ to $t_1$, the clutch is open, and disconnect clutch torque is zero. Beyond $t_2$, the clutch is closed, and the clutch torque is equal to the engine torque. From $t_1$ to $t_2$, the clutch is closing, and the torque capacity is variable. Disturbances in motor speed and torque, as illustrated between $t_1$ and $t_2$, may result in NVH.

NVH caused by slippage in the clutch may be avoided by controlling the traction motor torque to compensate for the torque disturbance arising from engaging the clutch. However, this requires an accurate calculation of the torque across the disconnect clutch. When the clutch is locked, the torque is equal to the engine torque. When the clutch is open, there is no torque transferred. When the clutch is slipping, i.e. neither locked nor open, the torque may be estimated based on the lesser of a clutch capacity $\tau_{pres}$ and engine torque $\tau_{eng}$:

$$\tau_{cap} = \min(\tau_{pres}, \tau_{eng})$$

During normal engine operation, the engine torque $\tau_{eng}$ may be available from a controller, such as the PCU or an engine control module ("ECM"). However, during some situations, such as during an engine start, the engine torque calculation may be unavailable or otherwise unreliable. During such situations, the disconnect clutch torque may be estimated based on the clutch capacity $\tau_{pres}$:

$$\tau_{cap} = \tau_{pres}$$

The clutch capacity may be calculated based on a commanded/actual clutch pressure P, a mean radius of friction surface r, a number of friction surface N and a clutch friction coefficient µ:

$$\tau_{pres} = \mu N r P$$

This calculation may be performed by a controller such as the PCU or a transmission control module ("TCM").

The torque across a slipping clutch may then be calculated according to:

$$\tau_{cl} = \alpha^* \tau_{cap}$$

The modifier α is calculated based on a speed differential across the clutch, between the engine speed and the motor speed, to account for the direction of torque transfer across the clutch:

$$\alpha = sgn(\omega_{motor} - \omega_{eng})$$

According to a conventional usage, a positive torque corresponds to the engine delivering torque across the clutch to the drivetrain. In a preferred embodiment, the modifier is calculated based on the hyperbolic tangent function of the speed differential:

$$\alpha = \tan h(\omega_{motor} - \omega_{eng})$$

By using the hyperbolic tangent function, the method avoids rapid changes from positive to negative torque based on relatively small changes in motor and/or engine speeds. A similar effect may be obtained by, for example, providing a hysteresis range near a zero speed differential.

Figure 3:
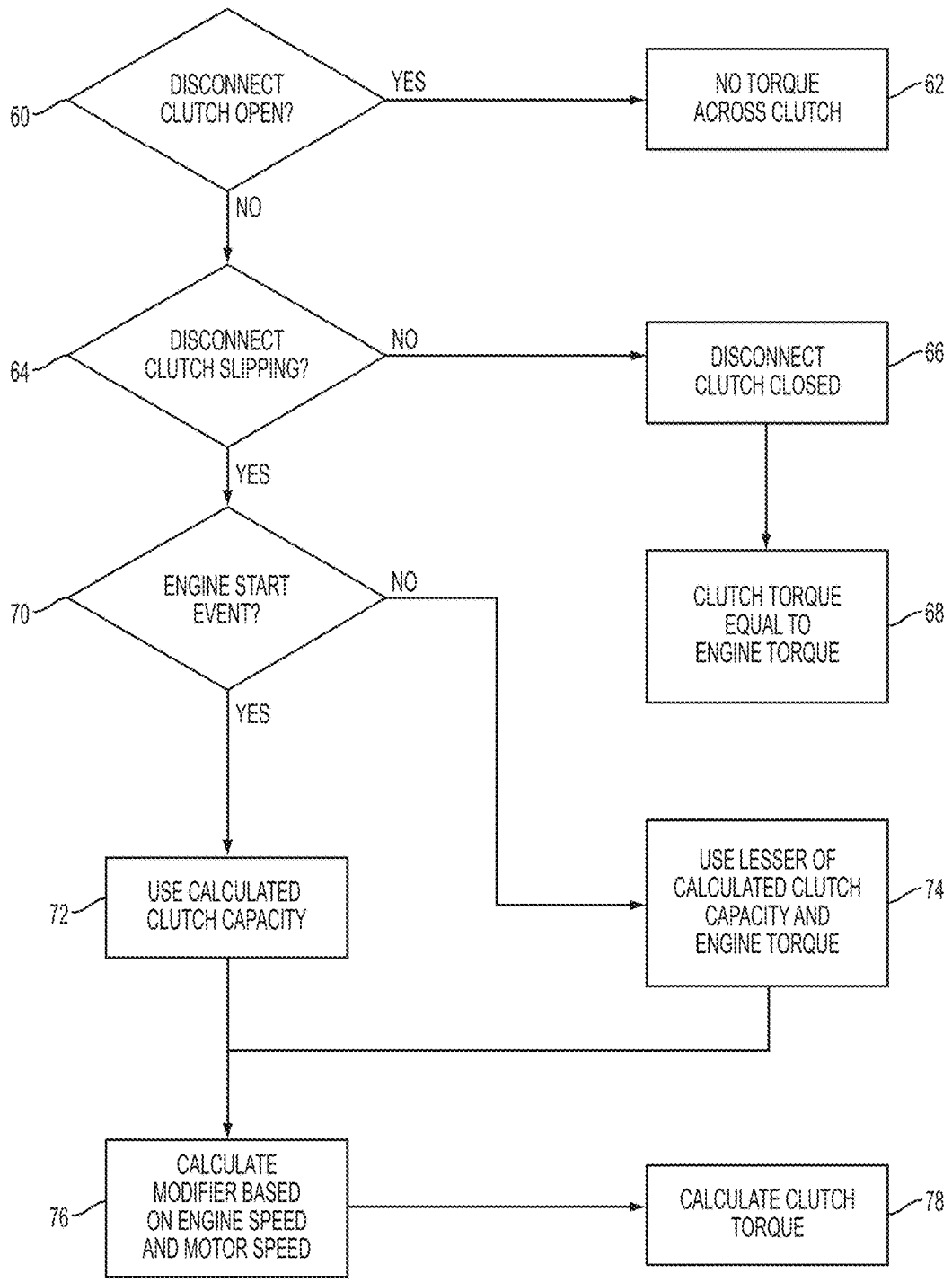
FIG. 3 illustrates a method of calculating torque in a disconnect clutch in flowchart form.

Referring to FIG. 3, a flowchart illustrates a method of calculating torque in a disconnect clutch. A determination is made of whether the disconnect clutch is open, as illustrated at operation 60. If yes, then there is no torque across the clutch, as illustrated at block 62, and so the calculated torque is set equal to zero. If no, a determination is made of whether the disconnect clutch is in a slipping condition, as illustrated at operation 64. If no, then the disconnect clutch is closed, as illustrated at block 66, and so the clutch torque is set equal to the engine torque, as illustrated at block 68. If yes, then a determination is made of whether the engine is starting, as illustrated at operation 70. If yes, then the calculated clutch capacity $\tau_{pres}$ is used in the torque calculation, as illustrated at block 72. If no, then the lesser of the calculated clutch capacity $\tau_{pres}$ and the engine torque is used in the torque calculation, as illustrated at block 74. In either case, a modifier is then calculated based on the engine speed and motor speed, as illustrated at block 76. Finally, the torque across the clutch is calculated, as illustrated at block 78.

Figure 4:
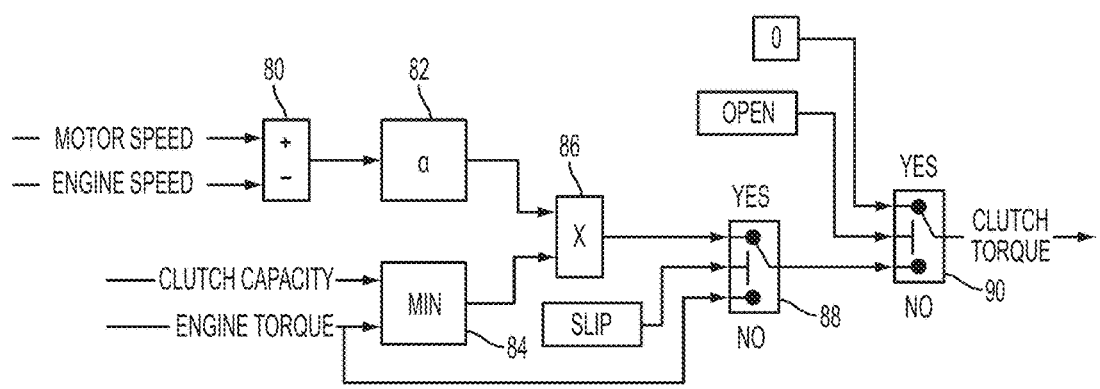
FIG. 4 illustrates a method of calculating torque in a disconnect clutch in block diagram form.

Referring to FIG. 4, a method of calculating torque across a disconnect clutch is illustrated in block diagram form. A current engine speed is subtracted from a current motor speed at block 80. The modifier α is calculated at block 82, as discussed above. In a parallel operation, a minimum value of a clutch capacity and an engine torque is determined at block 84. The result is multiplied by the modifier α at block 86. At block 88, a determination is made of whether the disconnect clutch is in a slipping condition. If yes, then the calculated clutch torque is fed forward to block 90. If no, then the engine torque is fed forward to block 90. At block 90, a determination is made of whether the clutch is open. If yes, then the clutch torque is set equal to zero. If no, then the clutch torque is set equal to the output of block 88.

In one embodiment, the above-described clutch torque calculation is performed repeatedly during the duration of a drive cycle. In such an embodiment, the motor may be controlled to compensate for any torque disturbances that give arise to slippage in the clutch, in addition to compensating for clutch torque during an engine start event.

Figure 5:
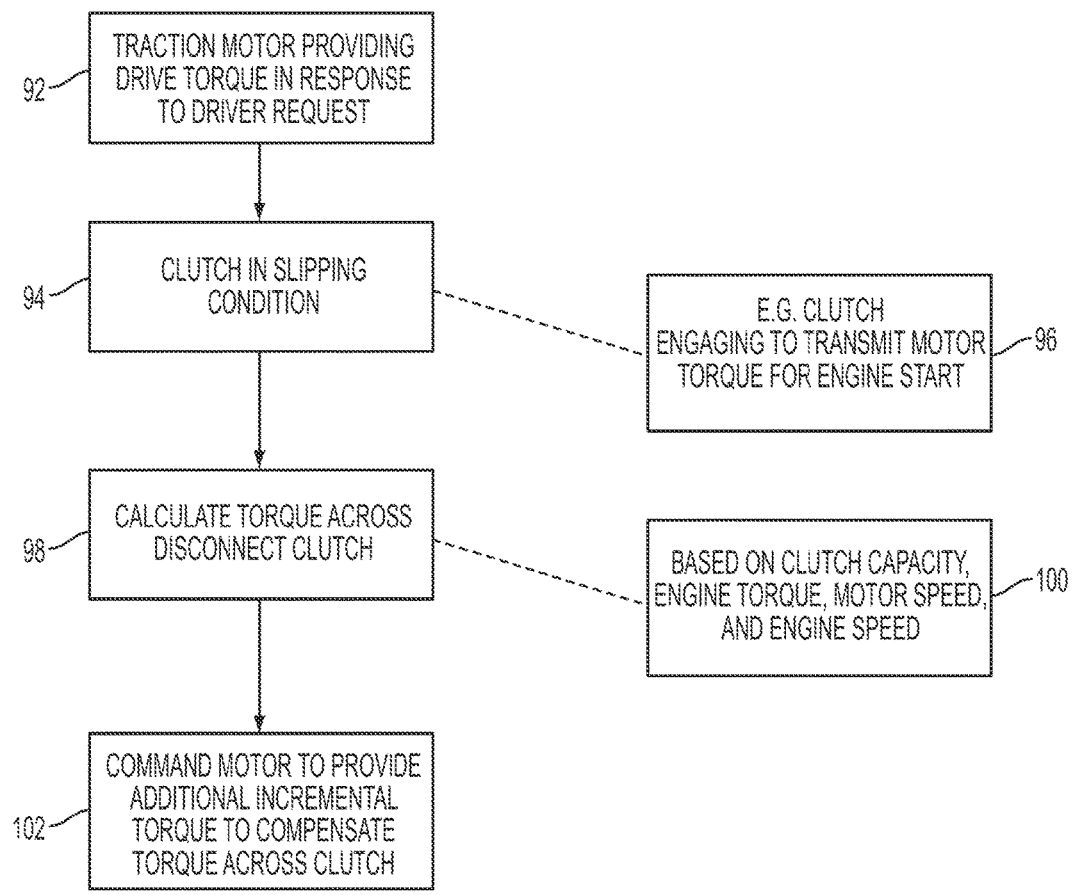
FIG. 5 illustrates a method of controlling a motor in a hybrid electric vehicle having a modular powertrain configuration in flowchart form.

Referring now to FIG. 5, a method for controlling a traction motor in a hybrid vehicle is illustrated in flowchart form. The traction motor is providing drive torque, as illustrated at block 92. A determination is then made that a disconnect clutch is in a slipping condition, as illustrated at block 94. This may occur, for example, when the clutch is engaging to transmit motor torque to an engine for an engine start event, as illustrated at block 96. The torque across the disconnect clutch is then calculated, as illustrated at block 98. The calculated torque may be based on a clutch capacity, engine torque, motor speed, and engine speed, as illustrated at block 100 and discussed above. The motor is then commanded to provide an additional incremental torque to compensate the calculated torque across the disconnect clutch, as illustrated at block 102. The motor thus provides a total torque to both satisfy a driver requested drive torque and to compensate the torque across the disconnect clutch.

As can be seen from the various embodiments, the present disclosure provides a robust method for calculating torque across a disconnect clutch in a hybrid vehicle. The calculated torque may be used to control a motor to compensate for the torque across the clutch, reducing NVH.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
an engine;
a traction motor;
a disconnect clutch selectively coupling the engine and motor; and
a controller configured to, in response to the clutch slipping, command the traction motor to provide an incremental torque equal to a speed difference modifier multiplied by: a) an engine torque if the engine torque is less than an estimated current clutch torque capacity, or b) the estimated current clutch torque capacity otherwise.

2. The vehicle of claim 1, wherein the speed difference modifier is determined using a difference between an engine speed and a motor speed.

3. The vehicle of claim 2, wherein the difference is defined by a hyperbolic tangent function of the difference.

4. The vehicle of claim 1, wherein the estimated current clutch torque capacity is estimated using a clutch pressure, a radius of a friction surface, a number of friction surfaces, and a clutch friction coefficient.

5. The vehicle of claim 1, wherein the controller is further configured to, in response to a driver torque request, command the traction motor to provide a total torque corresponding to a sum of a drive torque corresponding to the driver torque request and the incremental torque.

6. A method of controlling a vehicle having an engine, and a clutch configured to selectively couple the engine to a traction motor, comprising:
in response to slipping of the clutch and a current engine torque, commanding the traction motor to provide an incremental torque equal to a speed difference modifier multiplied by: a) the current engine torque if the current engine torque is less than a torque capacity of the clutch, or b) the torque capacity of the clutch otherwise.

7. The method of claim 6, wherein the speed difference modifier is based on a difference between a speed of the engine and a speed of the motor.

8. The method of claim 7, wherein the difference is defined by a hyperbolic tangent function of the difference.

9. The method of claim 6, wherein the torque capacity of the clutch is estimated using a current clutch pressure, a radius of a friction surface, a number of friction surfaces, and a clutch friction coefficient.

10. The method of claim 6, further comprising, in response to the clutch slipping and a current engine torque being unavailable, commanding the traction motor to provide an incremental torque corresponding to the torque capacity of the clutch.

11. The method of claim 6, further comprising, in response to a driver torque request, commanding the traction motor to provide a total torque corresponding to a sum of a drive torque corresponding to the driver torque request and the incremental torque.

* * * * *